United States Patent [19]

Selbert

[11] Patent Number: 4,844,539
[45] Date of Patent: Jul. 4, 1989

[54] COVERS FOR VEHICLE SEAT AND BACK AND METHOD OF MAKING SAME

[75] Inventor: Alan J. Selbert, Tecumseh, Mich.

[73] Assignee: Hoover Universal, Inc., Ann Arbor, Mich.

[21] Appl. No.: 267,831

[22] Filed: Nov. 7, 1988

[51] Int. Cl.4 ............................................. A47C 27/00
[52] U.S. Cl. ..................................... 297/219; 297/452
[58] Field of Search ......... 297/218, 219, 452, DIG. 1, 297/DIG. 2

[56] References Cited

U.S. PATENT DOCUMENTS

| 3,003,816 | 10/1961 | Wilson | 297/219 |
| 3,222,694 | 12/1965 | Schick | 297/219 X |
| 3,632,164 | 1/1972 | Radke | 297/219 |
| 4,557,522 | 12/1985 | Isikawa | 297/219 |
| 4,693,511 | 9/1987 | Seltzer et al. | 297/219 |

Primary Examiner—James T. McCall
Attorney, Agent, or Firm—Harness, Dickey & Pierce

[57] ABSTRACT

A cover member for a vehicle seat and back having smooth curved and contoured rounded corners. In forming the curved corners, a first fabric cover member is sewn with shirr stitching along the edge of the member around the corner to form a shallow pocket in the member. When the first and a second cover member are then sewn together and turned inside out, a smooth, rounded corner is formed having no puckering or darting along the seam thus formed between the cover members. The cover thus formed is then placed over a preshaped molded foam pad adapted to be mounted on a conventional seat back frame. The shirr stitching along the edge of the corner uniformly gathers the material along the edge of the corner presenting a curved surface in an otherwise flat fabric material. Shirr stitching is also utilized in the seat to enable the use of non-stretch fabric in covering irregularly shaped seats.

7 Claims, 2 Drawing Sheets

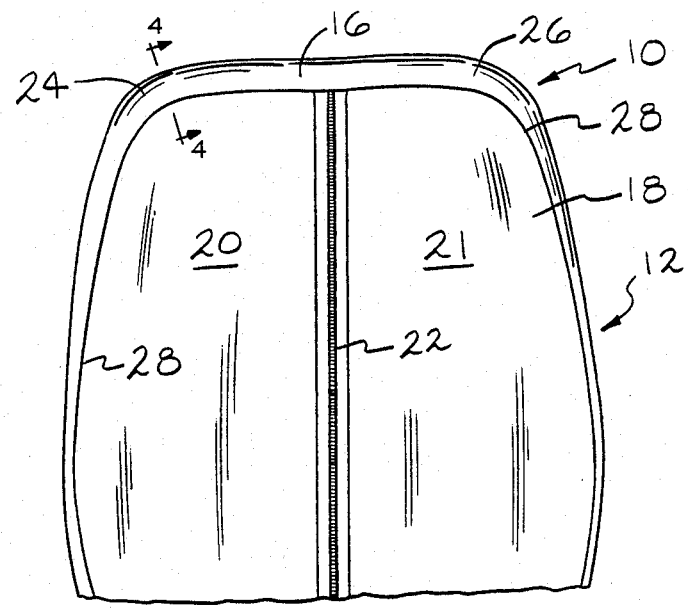
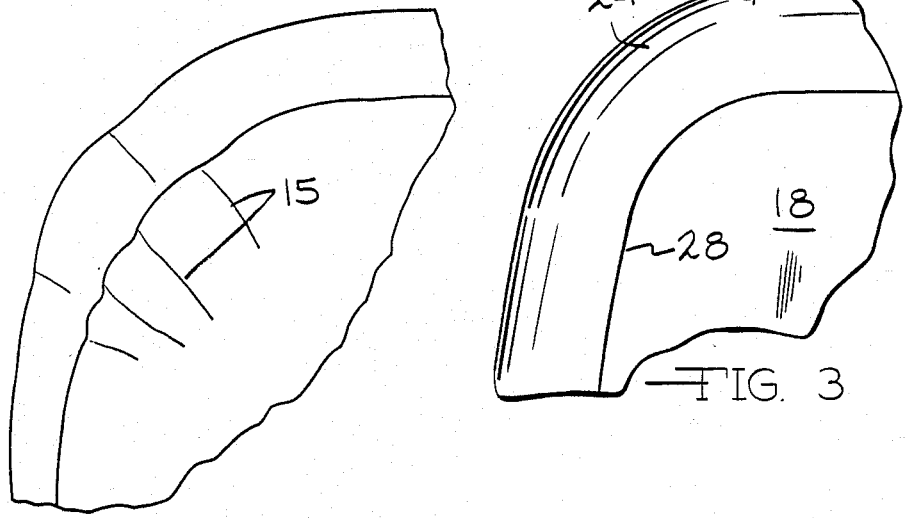
FIG. 1
FIG. 2
FIG. 3

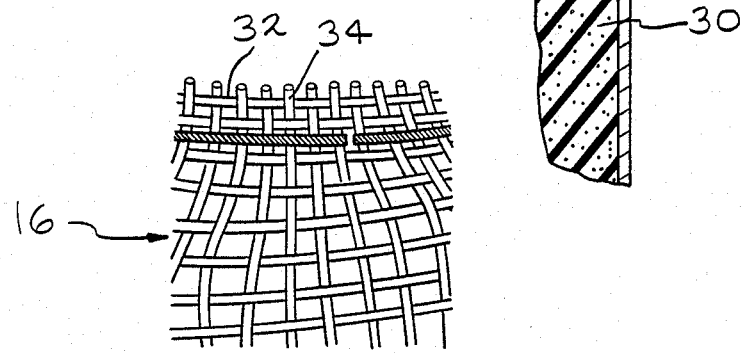
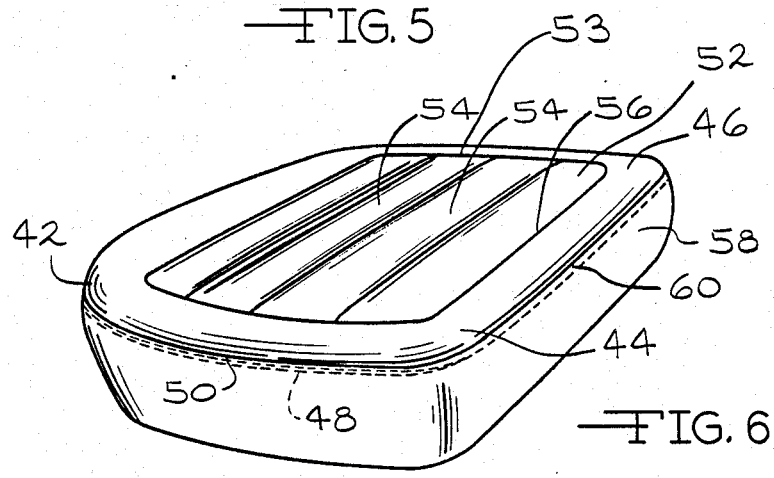

COVERS FOR VEHICLE SEAT AND BACK AND METHOD OF MAKING SAME

BACKGROUND OF THE INVENTION

This invention relates generally to vehicle seat assemblies and more particularly to a fabricated cover assembly which can utilize non-stretch fabric which is shaped and presents a smooth exterior surface around curved corners and on irregular surfaces.

Vehicle seat assemblies generally include a seat cushion and a back each having a rigid support frame and a contoured foam pad surrounding the support frame, and a seat cover assembly on the foam pad. The outside surface of the cover, in many places, presents a generally bulging, curved appearance. Difficulty is encountered, however, in achieving a smooth, curved form around the corners where the back of the seat cover assembly meets the front of the seat cover assembly when using conventional fabrics having little or no stretch characteristics. Often darts in the cover fabric appear along the curve.

This invention enables the use of inexpensive non-stretch in irregularly shaped vehicle seats.

The object of this invention is to provide a seat cover of a conventional fabric wherein the curved contour along the seam is smooth and free of visual gathering or darting of the material.

It is a further object of this invention to provide a seat cover having a smooth external contour around the corners by a simple and efficient construction method.

SUMMARY OF THE INVENTION

The vehicle seat cover assembly of this invention is used on a vehicle seat cushion assembly and/or a seat back assembly. Each assembly includes a first cover member and a second cover member joined together at a seam.

A back assembly according to the present invention includes a support frame, a front cover member, and a back cover member surrounding and enclosing a preshaped molded foam pad. The front and back cover members are precut from fabric type material. The cover members have curved corners adapted to be mated to each other along the edges of the material.

The corners on one member have shirr stitching with thread along a line parallel to the edge of the member around the corner. This shirr stitching gathers the material uniformly in small increments along the edge thus forming a gently curved pocket in the material along the curved corner. The edges of the two members are joined with thread stitching parallel to the edges, along the sides and top, forming an envelope having an open end.

The back member may also be formed from two half back members joined by a central zipper. When the front member is shirr stitched, the back member may be formed of a fabric, a leather or a naugahide material.

The front and back cover members are joined by (1) sewing the fabric of one cover member with a shirr stitch along the edge of the rounded corner substantially parallel to the rounded corner, (2) positioning the outside of the front cover against the outside of the back cover member in complimentary relationship along the edges of the cover members, (3) sewing the cover members together along their edges, and (4) turning the cover inside out so that the outside of the front cover is on the outside and the outside of the back cover is on the outside.

The cover thus formed can then be telescoped over the preshaped molded foam pad and then telescoped onto a support frame or alternatively, the seat cover having a vertical zipper in the back cover member can be positioned onto the foam pad and the zipper closed completing the assembly. The cover thus formed presents a smooth contour along the curved corners of the seat back assembly thus presenting a neat custom appearance and enhancing the fit of the cover to the foam pad enclosed within.

The shirr stitch construction may also be used to gather the extra fabric material at opposite ends of a portion of a vehicle seat or back cover such as a decorative seat insert to compensate for decorative tucks taken in the surface of the insert for the seat or back cover thus presenting a smooth, rounded contour in the surface of the finished cover. This is especially useful in obtaining a puffed appearance to the finished seat using a material having little or no stretch character.

Further objects, features and advantages of the invention will become apparent from a consideration of the following description and the appended claims when taken in connection with the accompanying drawings in which:

BRIEF DESCRIPTION OF THE DRAWINGS

FIG. 1 is a perspective view of a cover for a seat back according to this invention;

FIG. 2 is a partial perspective view of a conventional seat cover showing a corner of the cover installed on a seat back;

FIG. 3 is a partial perspective view of the corner of the cover shown in FIG. 1;

FIG. 4 is a cross sectional view of the cover along the line 4—4 in FIG. 1;

FIG. 5 is an enlarged view of the shirr stitching in the material of the cover member according to the present invention showing the gathering of threads of the cover material; and FIG. 6 is a perspective view of a vehicle seat cushion having cover corners and an insert according to the present invention.

DETAILED DESCRIPTION OF THE PREFERRED EMBODIMENT

With reference to the drawings, a cover for a foam encapsulated seat back according to a preferred embodiment of this invention, indicated generally at 10 is illustrated in FIG. 1. The vehicle seat back includes a front cover member 16 having edge 17 and a back cover member 18 having edge 19. The back cover member 18 consists of a left half section 20 and a right half section 21 joined by a zipper 22. The front cover member 16 is made of a suitable fabric material having a precut flat shape with curved corner regions 24 and 26. The back cover member 18 is cut from a suitable material or fabric having a precut flat shape with curved corner regions adapted to be mated to corners 24 and 26 of the front cover member 16.

Corner 24 and corner 26 have shirr stitching with thread along a line near the edge 17 of and substantially parallel to the curved corners to gather the material along the edge 17 forming a smooth curved pocket along the curved corners 24 and 26 of the front cover member 16. The front cover member 16 is joined with the back cover member 18 with stitching 36 with thread substantially paralled to and spaced from the edges 17 and 19 of the covers through both front and back cover members 16 and 18 mated in matching relationship forming a seam 28 on the inside cover 10. A preshaped molded foam pad 30 is enclosed between the joined front and back cover members 16 and 18 forming a smooth, shaped seat back assembly as shown in FIG. 1.

In conventional constructions, the corners of the covers on vehicle seat backs do not present a smooth contour. Uneven gathering of the material at the seams around the curved corners forms puckering or darts 15 like those shown in FIG. 2. As a comparison, the corner 24 formed in the present invention presents a smooth curved contour as shown in FIG. 3. In addition, smooth corners formed according to the present invention are shown on a decorative insert 52 for a vehicle seat in FIG. 6.

During assembly of the seat back cover according to the present invention, and a preferred embodiment shown in FIGS. 1, 3, 4 and 5, the cover is formed by first sewing the fabric of the front cover member with a shirr stitch generally parallel to and along the edge of the rounded corners 24 and 26. The shirr stitch 32 gathers the threads 34 lying at right angles to the direction of the shirr stitch 32, thus gathering the material and forming a curved pocket in the otherwise flat fabric of front cover member 16 around the corners 24 and 26.

Second, the outside of the front cover member 16 is then placed against the outside of back cover member 18 in complimentary relationship along the edges 17 and 19 of the cover members.

Third, the cover members are then sewn together with thread 36 along a line substantially parallel to edges 17 and 19.

Finally, the cover is turned inside out so that the outer side of the front cover member is on the outside and the outer side of the back have cover members are on the outside. The completed cover can then be placed over a preshaped molded foam pad which has in turn been positioned on a seat back frame (not shown). Zipper 22 is then closed thus completing the assembly of the seat back.

Alternatively, the cover may be formed without utilizing zipper 22 wherein the back cover member is a single sheet of material or fabric. In this embodiment the completed cover, turned outside out, would be telescoped over preshaped foam pad 30.

The principal advantage of the present invention is that the shirr stitching 32 accomplishes a uniform gathering of the material of the cover member so that when the front and back cover members are joined via stitching 36 no darting or puckering of the material along the curved corner seam is formed. The preshaped molded foam pad 30, when inserted within the completed cover 10 uniformly fills the curved pocket, thus presenting a smooth, curved contour to the outer surface of the completed seat back cover and thus presents a more tailored, custom appearance to the seat back assembly as a whole. This is an improvement over the prior art.

A vehicle seat cushion assembly having corners formed by the method described above is shown in FIG. 6. The vehicle seat cushion 40 has forward corners 42 and 44 on top cover member 46. The forward edge of cover member 46 is indicated by the lower dashed line 48 in FIG. 6. During assembly, as in the corners of the seat back described above, a shirr stitch 50 sewn across the front end and around the corners 42 and 44 of cover member 46 gathers the threads lying at right angles to the direction of the shirr stitch, gathering the material and forming the curved pocket and front in the otherwise flat fabric of seat cover member 46.

Cover member 46 also has a fabric insert 52 sewn into an opening 53 along seam 56. Insert 52 forms a series of generally parallel puffed portions 54 having smooth rounded contours formed according to the present invention.

Insert 52 is formed by first taking a piece of fabric wider than the finished insert and shirr stitching opposite ends to gather the extra material along the ends and forming a puffed contour. The length of the ends so stitched now matches the length of the cover member 46 along the edge of opening 53. A series of parallel tucks are then taken in the body of the insert between the ends forming the insert of finished size having smooth rib contours as shown in FIG. 6.

The parallel tucks may be formed by stitching or bonding portions of the insert together. The edges of the insert 52 are then sewn to the cover member 46 along the seam 56 to close opening 53. Cover member 46 is then sewn to bottom cover member 58 and the cover placed on a forming tool (not shown). A vacuum may be applied to the tool distributing the material smoothly. The cover is turned inside out so that the outer side of the seat cover members 46 and 58 are on the outside. The completed cover is then placed over a preshaped molded foam seat pad and bonded to the pad. The vehicle seat thus formed presents the smooth front edge contour and surface ribbed contour shown in FIG. 6 and forms a smooth seam 60 where cover members 46 and 58 are joined and smooth seam 56 where cover member 46 joins insert 52.

From the above description, it is seen that this invention provides an improved method of forming a contoured vehicle seat, back cover or contoured vehicle seat insert.

The method of this invention is particularly adapted for forming smooth rounded contoured surfaces on a fabric material having little or no stretch characteristics. Non-stretch material is advantageous because of its low cost. The contours so formed may be straight as in the insert 52 of seat cover 40 shown in FIG. 6 or shaped to form other aesthetically pleasing surface designs.

Modification in the above described structure can, of course, be made without departing from the scope of this invention. The above description represents only one embodiment of this invention and is not intended to limit the scope of the appended claims.

What is claimed is:

1. In a seat cover which includes a first cover member having an edge and a second cover member having an edge adapted to be in edge matching relationship to said first cover member, a portion of said first cover member having a shirr stitch along a line generally parallel and adjacent said edge thereof to gather the material along said edge and stitch means extending along said mated edges of said cover members through both said first and second cover members forming a seam at least a portion of which is adjacent said shirr stitching whereby said seat cover presents a smooth outwardly curved surface contour adjacent said seam.

2. In a vehicle seat assembly which includes a cover comprising a pair of cover members having complementary shaped edges, a preshaped molded foam pad enclosed by said pair of cover members, and a closure joining the edges of said cover members, the method of forming said cover comprising the steps of;

(a) sewing the fabric of one cover member with a shirr stitch along an edge portion of said one cover member forming a curved surface contour in said fabric adjacent said edge portion;
(b) positioning the outside of said one cover member against the outside of the other of said pair of cover members in complimentary relationship along the edges of said cover members;
(c) sewing said cover members together along their edges at a position adjacent said shirr stitch;
(d) turning said cover inside out so that the outer side of said pair of cover members are on the outside.

3. A vehicle seat back cover assembly comprising a front cover member and a back cover member,
said front cover member having a precut flat shape with at least one curved corner;
said back cover member having a precut flat shape with at least one curved corner adapted to be mated to said corner on said front cover member;
one of said corners of one of said members having shirr stitching with thread along a line generally parallel to said corner thereof to gather the material along said corner forming a curved pocket in said one member along said curved corner;
stitching with thread substantially parallel to and along the corners of said cover members through both front and back cover members mated in edge matching relationship forming a seam;
said front and back cover members and said seam forming an envelope having an open end; and
a preshaped molded foam pad enclosed within said envelope, said foam pad filling said curved pocket whereby said one corner of said members presents a smooth exterior contour along said seam.

4. The cover assembly according to claim 3 wherein said back cover member comprises a left half section and a right half section separated vertically by a zipper sewn between and along adjacent edges of said left and right sections.

5. In a vehicle seat assembly which includes a front cover member having a pair of upper end rounded corners, a back cover member having a pair of upper end rounded corners, a preshaped molded foam pad enclosed by said front and back cover members, and a closure joining the edges of said front and back cover members, the method of forming said cover comprising the steps of;
(a) sewing the fabric of one cover member with a shirr stitch along the edges of the rounded corners of one of said cover members;
(b) positioning the outside of said front cover member against the outside of said back cover member in complimentary relationship along the edges of said cover members;
(c) sewing said cover members together along their edges at a position adjacent said shirr stitch;
(d) turning said cover inside out so that the outer side of said front and back cover members are on the outside.

6. In a seat back cover which includes a front cover member and a back cover member, said cover comprising:
said front cover member having a precut flat shape with a pair of curved corners;
said back cover member having a precut flat shape with a pair of curved corners adapted to be mated to said corners on said front cover member;
said corners of said front cover member having shirr stitching with thread along lines generally parallel to said corners to gather the material along said corners;
stitching with thread parallel to and along the edges of said cover members through both front and back cover members mated in edge matching relationship forming a seam at least a portion of which is adjacent said shirr stitching whereby a preshaped molded foam pad can be enclosed between said front and back cover members with said corners of said members presenting a smooth exterior contour along said seam.

7. The seat back cover according to claim 6 wherein said back cover member comprises a left half cover member and a right half cover member separated vertically by a zipper sewn between and along adjacent edges of said left and right half cover members.

* * * * *